US005628913A

United States Patent [19]
Modig

[11] Patent Number: 5,628,913

[45] Date of Patent: May 13, 1997

[54] METHOD AND AN APPARATUS FOR PRODUCING PLANT NUTRITIVE PELLETS FROM WASTEWATER SLUDGE

[76] Inventor: Torsten Modig, Brogatan 2, S-903 25 Umeå, Sweden

[21] Appl. No.: 448,381

[22] PCT Filed: Dec. 29, 1993

[86] PCT No.: PCT/SE93/01112

§ 371 Date: Jun. 7, 1995

§ 102(e) Date: Jun. 7, 1995

[87] PCT Pub. No.: WO94/14730

PCT Pub. Date: Jul. 7, 1994

[30] Foreign Application Priority Data

Dec. 29, 1992 [SE] Sweden .................................. 9203930

[51] Int. Cl.[6] ...................................................... C02F 11/12

[52] U.S. Cl. ............................ 210/770; 210/609; 118/36; 118/308; 118/325; 71/12

[58] Field of Search .................................... 210/609, 768, 210/770, 771, 751; 118/35, 36, 308, 325; 71/12

[56] References Cited

U.S. PATENT DOCUMENTS 4,193,206 3/1980 Vere Maffet .

FOREIGN PATENT DOCUMENTS 0319789 6/1989 European Pat. Off. .
851070 10/1952 Germany .
1132896 7/1962 Germany .
3540818 2/1987 Germany .

OTHER PUBLICATIONS

Kurihara K., Dialog Information Services, Soil Improving Agent Comprises Ground, Digested Sludge Adsorbed or Coated with Dry Powder, File 351, World Patent Index 81–93, Dialog accession No. 003498936, WPI accession No. 82-46901E/23.

*Primary Examiner*—Neil McCarthy
*Attorney, Agent, or Firm*—Ostrolenk, Faber, Gerb & Soffen, LLP

[57] ABSTRACT

A method and an apparatus for producing plant nutritive pellets from raw sludge produced by wastewater treatment plants. The raw sludge has a water content normally in the region of 70–80%. Powder is used to stabilize the pellets and prevent their sticking together. The powder is added in connection with the sludge being formed into at least one pellet string or immediately after formation when the string has been cut into pellets. An air stream in which the powder has become entrained is used to douse the pellet string or the cut-off pellets, whereafter drying is readily peformed to provide a moisture content of about 10–15%, adequate for storage. The device according to the invention comprises an extruder for forming at least one pellet string, which by cutting-off means is cut into separate pellets, at least one blowing nozzle for lime powder intended to be doused over the pellets, a rotatable tumbler and a drying kiln, in which the pellets are dried to a moisture content adequate for storage.

12 Claims, 1 Drawing Sheet

METHOD AND AN APPARATUS FOR PRODUCING PLANT NUTRITIVE PELLETS FROM WASTEWATER SLUDGE

BACKGROUND OF THE INVENTION

1. Field of the Invention

The present invention relates to a method and an apparatus for producing plant nutritive pellets from the sludge arising from wastewater treatment.

2. Description of the Related Art

The major part of all sludge from wastewater treatment plants is deposited on garbage dumps in spite of the sludge containing valuable plant nutrition. The reason for this is not primarily fear of heavy metals in the sludge but, above all, the difficulties farmers have in dealing with such sludge continuously. Previously, attempts have been made to form the sludge into pellets directly but this has been found impossible, since the mass has too loose a structure, because of its high (70–80%) water content. Getting below this water content percentage has been found to be impossible in the sludge handling process, since most of the water in the sludge is cell-bound. In addition, it is very sticky, resulting in that any pellets formed quickly stick together and form large aggregates. It is almost impossible to dry out these large lumps to a sufficiently low water content for storage. These masses are also an infection hazard, since they always contain infectious organisms and substances, e.g. salmonella bacteria, different viruses and parasite eggs.

SUMMARY OF THE INVENTION

The object of the present invention is to provide a method and an apparatus of the kind mentioned above, where the pellets can be formed directly, while preventing the formation of aggregates; such that there is the possibility of effectively drying the pellets down to a water content of about 10–15%, which is adequate for storage, and simultaneously eliminating the infection hazard during handling. The distinguishing features of the invention have been disclosed in the following claims.

By reason of the invention there has now been provided a method and an apparatus that fulfill the inventive objects in an excellent manner. The following advantages are obtained by the pelletization. By dousing the pellets with a preferably hygroscopic powder they will be stiffer as they are pressed out from the extruder, thus enabling them to maintain their shape. The coating of dry powder also prevents them from sticking together to form aggregates as well as enabling them to be dried more easily and quickly. The dry powder, which can be hygroscopic, rapidly absorbs moisture from the surfaces of the newly formed pellets and this moisture is then rapidly drawn away in the hot, dry atmosphere of the tumbler. As the powder is dried out it loosens from the pellets, enabling it to be recycled in the process. The pellets may then be dried conventionally, e.g. as with cereals, to a water content of about 10–15%, adequate for storage. Pellets produced according to the invention can in this way now be delivered at a time suitable to agriculture, since they are capable of being stored. In addition, they can be spread in the same way as artificial fertilizers and thus take the place of large amounts of the latter. The risk of spreading infection is inhibited by heating the pellets to a temperature of 80° C. for fifteen seconds. By using modern heat exchanger technology, drying and pelletization according to the invention can take place with very low energy requirements.

BRIEF DESCRIPTION OF THE DRAWINGS

The invention will now be described in more detail with the aid of a preferred embodiment and with reference to the accompanying drawings, where FIG. 1 schematically illustrates an apparatus for carrying out the method in accordance with the invention, and FIG. 2 schematically illustrates, to an enlarged scale, a section through the extruder nozzle and openings therein, which are provided with an annular, peripherally slotted jet for blowing out compressed air.

DETAILED DESCRIPTION OF THE PREFERRED EMBODIMENTS

Figure 1:
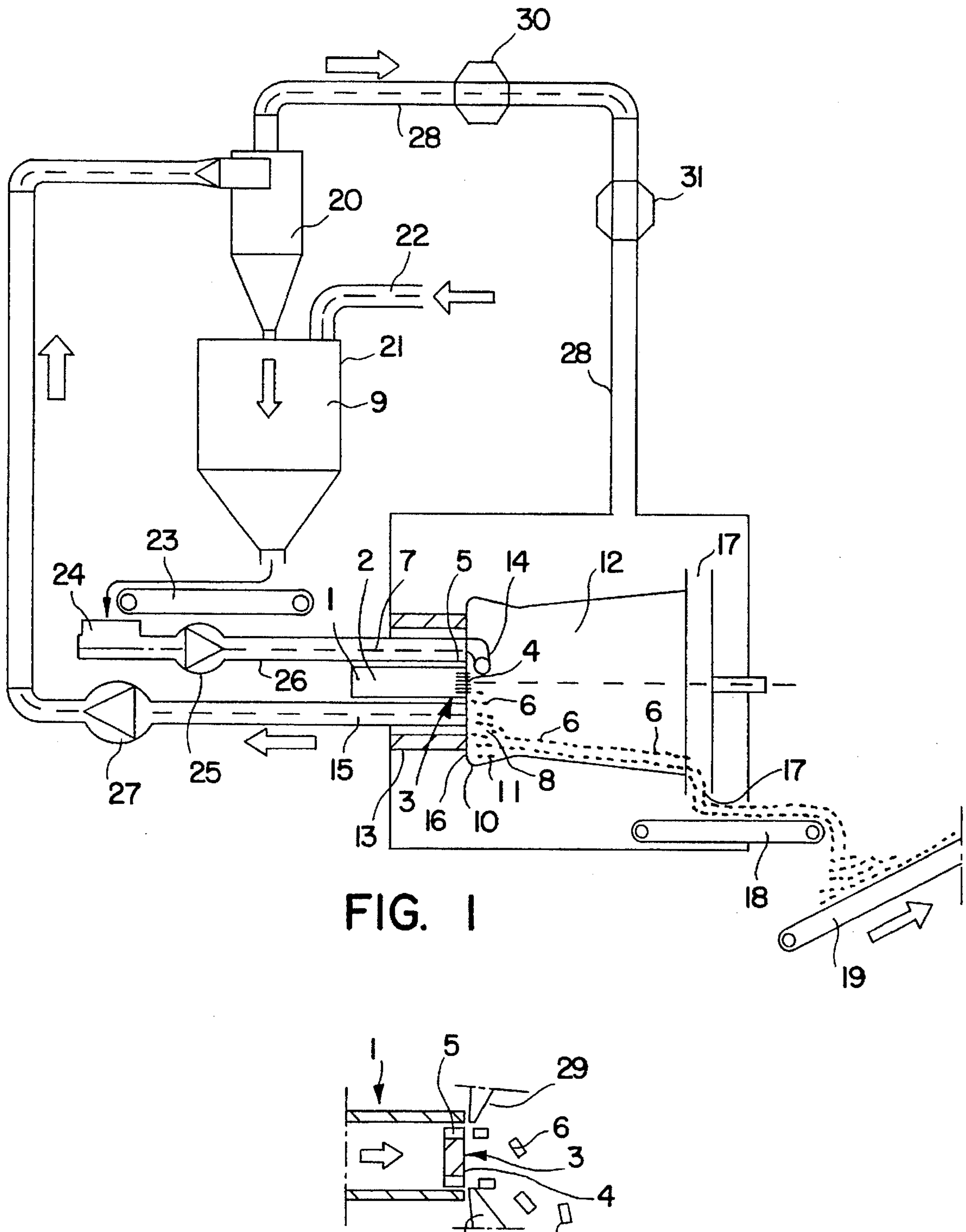

FIG. 1 is a schematic view of an apparatus for producing plant nutritive pellets from the sludge arising from wastewater treatment. Pelletization takes place with the aid of an extruder 1, through which the sludge 2 is urged to at least one nozzle 3, which has at least one orifice 4. In the illustrated example, the nozzle 3 has a plurality of orifices 4 located close to each other, through which the sludge can be urged to form a plurality of mutually parallel pellet strings 5.

Figure 2:
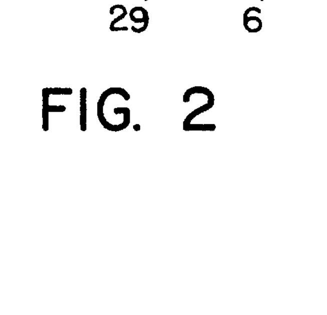

Cutting-off means, not illustrated in detail on the drawing, are provided for cutting off the separate pellets 6 from the pellet strings 5. The cutting-off means may comprise a compressed air stream coming from an annular, peripherally slotted jet 29, schematically illustrated in cross-section in FIG. 2. The jet means is disposed so as to direct the air stream convergingly to the center of the nozzle 3. A thin wire can also be Used for cutting off the pellets or any other suitable means may be used. However, the air stream jet functions in a way eliminating the risk of forming deposits from the sticky mass, which can otherwise occur, particularly on knives, if such are used.

In the vicinity of the orifices 4 there is at least one nozzle 14 for blowing powder 9 on to the pellets. This nozzle 14 is directed towards the nozzle 3 in a suitable way for blowing powder 9 entrained in an air stream 7 such as to completely coat the extruded pellet strings 5 and/or the separated pellets 6. In the preferred embodiment example according to the invention the latter also prescribes that dousing with powder can take place continuously or intermittently. For other inventive embodiments, dousing can naturally take place either before the pellet strings 5 have been cut up, as they are cut or after separation into separate pellets 6.

The inventive apparatus includes a rotatable tumbler 12, situated below the extruder 1, and the tumbler is provided with a depression 10 inside it for collecting an amount 11 of excess powder, in which a quantity 8 of pellets 6 can be collected. The depression 10 is in the closed portion 16 of the tumbler 12, this portion being mounted for rotation in a fixed member 13 of the apparatus. The fixed member 13 houses the extruder 1, the powder nozzle 14, the air stream 7 for entraining the powder 9, a suction duct 15 for excess powder and finally the annular, slotted jet 29.

The end of the tumbler 12 remote from the depression 10 coacts with a gap 17, through which the coated pellets 6 pass, and below them is a conveyor 18 for transferring the pellets 6 to a conveyor 19, which takes them to a conventionally operating drying kiln. Predrying of the pellets thus takes place in the tumbler 12 until the powder coating loosens and they have obtained a certain amount of strength, whereafter final drying is performed in the kiln in a manner known per se.

As will be seen from FIG. 1, the inventive pelletization apparatus may also include a hopper 21 for the lime powder 9 and it can be filled via a duct 22. The lime powder. 9 is discharged onto a conveyor 23, from whence it is fed into a duct 26 via an opening 24. Different means for powder dousing can be envisaged, e.g., such as use of compressed air. With such a means a special vacuum nozzle is used to suck up the powder directly from the hopper 21 for subsequently spraying it over the extruder nozzle 3.

In FIG. 1 there is illustrated a blower 25 in the duct 26 for blending air and lime powder 9 such as to entrain the latter in an air stream 7 passing through the duct 26 to the nozzle 14. The powder 9, whirling around in the tumbler or forming a mass 11 in the depression 10, is recycleable and sucked out via the duct 15 with the aid of a blower 27 and further up to a cyclone 20 having an unillustrated filter. Powder 9 is discharged from the cyclone 20 into the hopper 21.

Return air from the cyclone is taken via a duct 28 past a cooling battery 30 for cooling and dewatering and past a heating battery 31 for subsequent entry into the tumbler 12, thus ensuring that air entering the tumbler has a very low moisture content. It is intended that this air causes strong turbulence in the tumbler, so that excess powder on the pellets loosens, enabling such powder to be recycled.

With the aid of the apparatus described above the method according to the invention is adopted as follows: The sludge coming from a wastewater treatment plant is fed in a manner not illustrated here to and through the extruder 1, such as to be urged through the extruder nozzle 3 the latter having a plurality of orifices 4, through which the sludge 2 passes to form separate, mutually parallel pellet strings 5. As they come out from the orifices 4 the strings 5 are cut off to form individual pellets 6 with the aid of the air stream coming from the annular, peripherally slotted jet 29, simultaneously as the pellet strings projecting from the orifices and/or the cut-off pellets are continuously doused with powder entrained in an air stream. The purpose of dousing the pellets is to facilitate drying them, stiffen the pellet strings and prevent the pellets from forming aggregations as they come from the orifices 4. Simultaneously as this takes place the tumbler 12 is rotating and the pellets 6, that have fallen down into it, are effectively given a complemental coating of powder 9 over their entire surface from the powder in the depression 10 as well as powder in the bottom part of the tumbler.

The pellets 6 move along the inner shell surface of the tumbler 12 from the depression 10 and, at the end of the tumbler 12 remote from the depression, they fall via a slot 17 onto a conveyor 18 to be transferred to a conveyor 19 taking them to the drying kiln, unillustrated on the drawing. Using known techniques they are dried there for a predetermined time to a water content of about 12–15%, adequate for storage. In a preferred application of the method, the pellets are heated in one of the sequences in the drying process, e.g., using a microwave oven, to a temperature of about 80° C. for 15 seconds. The dosage of a suitable quantity of powder in relation to extruder capacity and recycling excess powder are regulated as desired. The drying process is facilitated and the water content in the pellets is lowered with the aid of powdering, using the dry lime powder.

The addition of a lime powder will not notably make the sludge handling more expensive, since Wastewater handling plants normally add lime (about 200–300 kg per ton sludge dry substance). The originally lime-lacking sludge has lime added to make it more attractive to agriculture from the plant nutrition aspect. However, this addition could be questioned, since alkalization causes nitrogen losses due to the departure of ammonium hydrate. Coating the surfaces of the pellets with lime powder does not give such large nitrogen losses as does mixing lime into the whole mass. With the powder coating only the actual surfaces will be alkalized and during storage of dried pellets there are no nitrogen losses, since the chemical processes practically cease with low water content. It may therefore be assumed that pelletized sludge will have a higher nitrogen content than untreated sludge.

Although the present invention has been described in relation to particular embodiments thereof, many other variations and modifications and other uses will become apparent to those skilled in the art. Therefore, the present invention shall be limited not by the specific disclosure herein, but only by the appended claims.

I claim:

1. A method of producing plant nutritive pellets from raw sludge produced by wastewater treatment plants, the raw sludge having a water content in the region of 70–80%, where pelletization takes place without further dewatering of the sludge and where a powder is used to stabilize the pellets and prevent their sticking together, the powder being added in connection with the sludge being formed into at least one pellet string and after formation of the pellet string when the string is eventually cut into pellets, the method comprising the steps of:

forming the sludge into a pellet string;

cutting the pellet string into pellets;

supplying an air stream in which the powder has become entrained to douse the pellet string and/or the cut-off pellets so as to give the pellet string and/or the cut-off pellets strength, and to prevent the formation of aggregates during subsequent collection of the pellet string and/or cut-off pellets; and drying the pellet string and/or cut-off pellets to provide a moisture content of about 10–15% adequate for storage of the pellets.

2. A method as claimed in claim 1, where pelletization takes place with the aid of an extruder, through which the sludge is urged towards at least one extruder nozzle having at least one extruding orifice through which the sludge can be urged so as to form pellet strings, wherein after exiting from the orifices the strings are cut into separate pellets simultaneously as the pellet strings and/or the pellets are continuously doused with the air stream and its entrained powder.

3. A method as claimed in claim 1, wherein the powder entrained in the air stream is a lime powder, which coats the pellet strings as well as the cut-off pellets.

4. A method as claimed in claim 1, wherein the pellets are coated with the powder, the method further comprising the step of tumbling the pellets in excess powder which collects at a bottom portion of a rotating tumbler.

5. A method as claimed in claim 1, further comprising the step of conveying the powder-coated pellets to a drying kiln in which the pellets are dried, subsequent to which the pellets are stored and bagged.

6. A method as claimed in claim 5, further comprising the step of heating the sludge or pellets.

7. An apparatus for producing plant nutritive pellets from sludge arising from wastewater treatment plants, the apparatus comprising:

an extruder with a nozzle provided with at least one orifice for forming the sludge into at least one pellet string;

means for cutting pellets from the pellet string;

a blowing nozzle for powder entrained in an air stream and directed towards the pellet string and pellets cut off from the pellet string;

a rotatable tumbler having excess powder at a lowest region, and a slot through which pellets leave the tumbler;

a conveyor for conveying the powdered pellets received from the slot to a drying kiln in which the pellets are dried to a moisture content during a given time, subsequent to which the pellets are ready for storage and bagging.

8. An apparatus as claimed in claim 7, further comprising a suction duct for recovering excess powder from the tumbler.

9. An apparatus as claimed in claim 7, wherein the cutting means for the pellets comprises an annular compressed air jet directed towards the center of the extruder nozzle for intermittently cutting off the pellet strings.

10. A method as claimed in claim 4, further comprising the step of recovering surplus powder from the bottom of the tumbler.

11. A method as claimed in claim 6, wherein the pellet string and/or the pellets are heated during the process so as to kill infectious organisms and substances.

12. The method of claim 11, wherein the infectious organisms and substances are selected from the group consisting of bacteria, viruses, and parasite eggs.

* * * * *